Patented Dec. 2, 1941

2,264,732

UNITED STATES PATENT OFFICE 2,264,732

MANUFACTURE OF PROTEINACEOUS PHENOLIC RESIN

Harry M. Weber, West Englewood, N. J., assignor, by mesne assignments, to Prolamine Products Incorporated, Dover, Del., a corporation of Delaware No Drawing. Application March 6, 1939, Serial No. 260,111

19 Claims. (Cl. 260—7).

The present invention relates generally to synthetic resins, plastics and coating compositions combining protein, a phenolic substance and an aldehyde.

The union of phenols and aldehydes to form resins and plastics is well known and may be performed in many variations of the process. It is also known to combine a protein with condensation products of a phenol and an aldehyde, as described in Weichman No. 1,135,340 and Hansen No. 2,047,961. It is well known that corn protein dissolved in a cresol may be used as the phenolic ingredient for plastics, and molded at high temperature with an aldehyde to form a plastic, as described by Berlin Patents No. 1,888,785 and No. 1,988,475. However, none of these processes lead to the product obtained as described herein.

The object of the invention is to provide a method of producing cast, molded, coated and impregnated articles from the reaction products of phenolic substance, protein, and aldehyde, and a product for such uses, superior in many ways to those heretofore used for such purposes.

The invention pertains more particularly to the control of conditions whereby a particular type of product results. The process converts a water-insoluble protein, having the property of absorbing water to a high degree into an intermediate useful product which is dispersible in water and in alcohol, and yet is thermo-setting. Such product is capable of being hardened by heat to a water-insoluble and infusible synthetic resin which is low in water absorbing capacity. In addition, the thermo-set product possesses valuable functional properties in that it is tougher and consequently highly resistant to scratching and abrasion, exceeding in this respect, similar resinous products plasticized by non-protein materials. It also differs from these latter materials in improving for example the flexibility of laminated or impregnated products prepared from it. These properties are of particular importance in the production of laminated sheet material that is to be subsequently machined or punched.

In carrying out the process, the protein preferably employed is of the alcohol-soluble type, as proteins are classified, being a prolamine when of vegetable origin, and a protamine if of animal origin. The protein is not limited to the prolamines and protamines, and it may be protein material in which these types form a large or major constituent. For example, destarched corn gluten may be used. This comprises from 50% to 80% protein, associated with fiber, oil, ash and moisture. About 50% of the protein is the prolamine zein. The remainder of the corn protein is not water soluble and not alcohol soluble, but along with prolamine acts the same in the process of the present invention. The destarched gluten may be prepared by an acid treatment according to the process described in the copending application of Shildneck Serial No. 256,773, filed February 13, 1939. According to this process the strength of acid is such that the protein itself is modified to increased solubility in alkalis. The well-known property of phenolic substances, particularly of phenol and cresol, to dissolve such proteins, especially the prolamine, may be utilized to employ the phenol as a distributing vehicle for the protein. Whether the protein is thus physically dispersed or is chemically combined, or both, is immaterial. The phenolic dispersion of the protein is reacted in aqueous solution with or without alcohol in addition, with the selected aldehyde.

The protein material need not be dispersed through the agency of the phenol alone. It cannot be dispersed in water by the aldehyde, but it is readily dispersed by the mixed aldehyde and phenol in water, before the reaction is permitted to take place, or in the early stages of the reaction. However, to assure complete and proper dispersion of the protein before resin-forming reactions occur, the protein is preferably dispersed by the phenol before association with the aldehyde.

By using commercial formalin, a solution containing about 40% of formaldehyde gas in water, as the aqueous vehicle for reaction, and a phenol-protein dispersion, one may be added to the other, and a homogeneous aqueous dispersion or solution results. An acid or alkaline condensing agent, such as those ordinarily used for condensing phenols and aldehydes may be added if desired to accelerate the desired reaction.

The present process differs from those heretofore proposed in that careful control of the temperature is maintained during the primary reaction period. I found that when the solution is heated above 100° C., the reaction proceeds rapidly to provide a product which separates as a solid which is insoluble in solvents including alcohol and phenol. But when the temperature is kept below 100° C., preferably from 80° C. to 98° C., an entirely different product is formed. As the reaction proceeds the solution of the reacting materials remains clear and there is no phase separation, whether the solution is acid, neutral or alkaline. Upon completion of the initial reaction, cooling of the clear solution results in the production of an opaque semi-solid emulsion without separation of water. Reheating will reverse the process to form the clear solution again. This solution may be dewatered by evaporation or vacuum distillation to provide a viscous or semi-solid, or solid mass, as the useful product or the process. This product may be used as a base for plastics, with or without fillers in well known ways.

The solution before dewatering is capable of extension by water and by water-miscible alcohols, such as methyl, ethyl, propyl and others. The solid resulting from dewatering is still alcohol-soluble, but insoluble in water. It is believed that in dewatering, a further condensation towards the insoluble infusible stage has taken place. Solutions resulting from the reaction or by extending such reaction solutions, may be used for coating and impregnating. Hardening agents known to the phenol-aldehyde resin art may be used where accelerated hardening is desired, such as hexa-methylene tetramine. In general, however, a prolonged heat treatment at elevated temperature to heat-set the resin is preferable, as accelerated hardening reduces to some extent the improved properties of the resin.

The reactions are carried out in closed containers or reflux apparatus to conserve volatile materials. Where alcohol may be present as mentioned below, it is desirable to conserve it and its function as indicated. It is also most desirable to conserve the aldehydes, especially the more volatile formaldehyde.

*Example 1*

100 parts by weight of zein are dissolved in 100 parts by weight of phenol. Then 230 parts by weight of 40% commercial formalin are added, with 1 part by weight of potassium hydroxide as the catalytic agent. The solution is held at 90° C. to 98° C. with agitation for about 5 hours. A clear solution somewhat darker than the initial mixture is obtained, but there is no separation of liquid and solid phases. If a portion of this is heated at its boiling point for a short time, a solid gelatinous mass will separate, which is insoluble in water, alcohols and phenols, and not readily fusible. The reaction solution is acidified in order that the succeeding stages of reacting the product to a thermo-rigidity be carried out in the presence of an acid catalyst, as these conditions serve best to give a light colored product. Lactic acid is preferred for this purpose. A clear, transparent cast resin-like product was produced by the foregoing procedure, the final hardening being accomplished by heating the shaped product at a temperature of 60° C. to 100° C. for a period of 24 to 48 hours.

Where a concentrate or resin-base is desired the excess water is removed by vacuum distillation, thus to avoid a temperature over 100° C. and the resulting ruin of the product. At 25 mm. mercury pressure, distillation may be continued until the liquid on cooling forms a transparent semi-solid. In this way a dewatered produce is obtained which is a viscous transparent fluid soluble in alcohol, but insoluble in water. This liquid may be poured or forced into molds and heated with or without pressure to harden it. As indicated above the time will vary depending on the size and form. For example, for rods of ⅜ inch diameter, heating for 24 hours at 60° C., followed by 80° C. for 24 hours gives a clear transparent solid, without separation of water, that is hard, tough and readily machined when cold. Hardening agents may be added to shorten the time of heating. Similarly prepared, the initial reaction solution, or the product of the first heating period, may be used to coat or impregnate, and be diluted with alcohol or water or both, if desired.

*Example 2*

In this instance, the amount of the 40% formaldehyde solution is reduced to 100 parts by weight, and the time of heating to 2 hours at a range of temperature from 85° C. to 90° C. A clear transparent solution results which can be distended by either water or a water-miscible alcohol. To this reaction solution, is added 10 parts by weight of hexamethylene tetramine. Then 100 parts by weight of wood flour may be incorporated, and the mass dried in a vacuum drier up to a temperature of 85° C. A solid voluminous, powdery mass thus obtained is capable of being sheeted on rolls and subsequently pulverized to better adapt it to molding operations. This molding powder may be placed in a mold for hardening at 160° C. and 4000 pounds pressure per square inch. The brown product is insoluble, infusible, and unaffected by immersion in water.

Where an intricate mold pattern is involved any well known plasticizer may be added to the resin base, either before or after dewatering. For example, using excess phenol initially, or after condensation provides a suitable plasticizer. Adding 10% more phenol or using 10% less formaldehyde serves the purpose.

Any phenol or aldehyde which is suitable for the phenol-aldehyde types of resin may be used, such as the simple and substituted phenols, cresols, xylols, resorcinols, and others. The higher alkyl phenols, such as octyl phenol are included, these being commonly used in making clear resins with formaldehyde. Suitable aldehydes are paraldehyde, paraform, acetaldehyde, furfural, and others. Where the phenolic substance is not sufficiently soluble in water for the reaction, an alcohol miscible with water may be added before the reaction. Such addition will also serve to control reaction temperature by lowering the boiling point of the reacting mass at atmospheric pressure. The prolamine may be other than the zein from corn, such as hordein from barley, gliadin from wheat, and the protamine may be of fish or animal origin. The mechanism of the reaction is the same with such substitutions, and changes may readily be made by those skilled in the art.

*Example 3*

100 parts by weight of zein, 200 parts by weight of formaldehyde (40% aqueous solution) and 200 parts by weight of mixed meta and para isomers of cresol, are reacted 2 parts by weight of concentrated (28%) ammonia solution as catalyst. The water is provided by using the formaldehyde as formalin solution and by use of the ammonia. Reaction is carried out at 95° C. to 99° C. for 2 hours, when on a small laboratory scale. In larger quantities, the time at this temperature may be shortened owing to the longer time required in arriving at such temperature to satisfactorily control the reaction, due to its nature. Total time may be as much as 6 to 7 hours or longer for such preheating and final heating.

As well known in the plastic art the proportions of aldehyde and phenol may be varied over a wide range. Likewise, the proportion of protein may be varied. For example, in the procedure of Example 2, 40 parts by weight of protein have been used in place of the 100 parts given and a toughened resinous product results. The effective upper limit for protein is 70% of the weight of the phenol. The lower practical limit for protein is 30% of the weight of phenol, but there is no lower effective limit. Below said 30% the toughening effect of the presence of protein begins to be lost, and the product is more like a phenol aldehyde resin made in the same way but without any protein. The preferred limits are therefore from 30% to 70%, based on the original phenol constituent of the reaction mass. The invention therefore contemplates a protein content from 0% to 70% based on the weight of phenol. Some adjustment of the amount of formaldehyde used for the reaction is necessary, where the protein content of the reacting mixture exceeds that of the phenol present. The amount of formaldehyde to be used may be expressed as an amount equal to that ordinarily employed for the phenol-aldehyde resin reaction plus 5% of the protein incorporated. Except in those cases where a highly plastic product is desired, this is a general rule for all practices under this invention. Fillers may vary over a wide range, for example, mica, asbestos, barium carbonate, titanium oxide, cotton flock, wood pulp, rags, wood flour and like ingredients. Laminated products may be made in the usual way.

The reactive resin may be used in various arts such as varnishes, enamels, rubber or rubber-like products, to impart desirable properties. It may be used in sizing fibrous products such as paper or fabrics of cotton, rayon, silk, or wool, alone, or in admixture with other sizing and emulsifying materials.

The invention involves the preliminary association of the protein, the aldehyde and the phenol, and a homogeneous aqueous reaction mass of such associated materials with or without a water-miscible alcohol, and a temperature for reaction short of 100° C. The product is not the same when the same ingredients are reacted to provide the resin in the absence of the protein, and then the protein introduced. This is well illustrated by the properties of rag paper impregnated with various agents.

Three different products have been compared in a like usage. A product according to the present invention, as made by Example 3, in water solution was used as a varnish to impregnate 4-point rag paper. This was dried to a resin content of 52.5% and a volatile content of 9.1%. Upon laminating the impregnated sheets and heating to harden, the thickness was 0.042 inches, and the moisture absorption in 24 hours was 3.66%. This has been compared with comparable working varnishes compounded of zein and commercial phenol-formaldehyde resins or varnishes, by impregnating paper to a like resin content. The moisture absorption is double and more than where the product of the present invention is used, even though the commercial phenol aldehyde resin referred to, when used alone, produced an entirely waterproof product.

Additional advantages of laminated products produced with the resinous complex of the present invention, over both the commercial resin alone or mixed with protein, lay in the improved flexibility of the sheeted product, shaping the product to a limited extent by warming to 100° C. and applying pressure; improved punchability of the stock where subsequent fabrication is needed, and the improved resistance to abrasion.

For example, a sheet of the laminated product of this nature was, after heating to 90° C. to 100° C., bent to form a circular collar encircling a ½" wire, without fracture, and after cooling retained its shape. The importance of this property is obvious and does not require explanation to workers in electrical fields.

The foregoing description and explanation of the invention, and the uses thereof, are intended merely to illustrate, and not limit the invention. Numerous variations and modifications of the invention will be apparent to those skilled in the art and are contemplated as falling within the scope of the invention as expressed by the appended claims.

I claim:

1. The process of making a thermo-setting resin product which comprises dispersing an alcohol soluble protein in a resin-forming phenolic substance, and condensing the dispersion with a resin-forming aldehyde in an aqueous dispersion of said materials, said condensation being conducted at a temperature not higher than 100° C. whereby a water and alcohol soluble potentially reactive condensation product results.

2. The process of making a thermo-setting resin product which comprises dispersing an alcohol soluble protein in a resin-forming phenolic substance, and condensing the dispersion with a resin-forming aldehyde in an aqueous dispersion of said materials, said condensation being conducted at a temperature not higher than 100° C. whereby a water and alcohol soluble potentially reactive condensation product results, and dewatering the resulting dispersion by evaporation at a temperature below 100° C. to provide a resin-base concentrate.

3. The process of making a thermo-setting resin product which comprises dispersing an alcohol soluble protein in a resin-forming phenolic substance, and condensing the dispersion with a resin-forming aldehyde in an aqueous dispersion of said materials, said condensation being conducted at a temperature from 80° C. to 100° C. whereby a water and alcohol soluble potentially reactive condensation product results.

4. The process of making a thermo-setting resin product which comprises dispersing an alcohol soluble protein in a resin-forming phenolic substance, and condensing the dispersion with a resin-forming aldehyde in an aqueous dispersion of said materials, said condensation being conducted at a temperature from 80° C. to 100° C. whereby a water and alcohol soluble potentially reactive condensation product results, and dewatering the resulting dispersion at a temperature below 100° C. to provide a resin-base concentrate.

5. The process of making a thermo-setting resin product which comprises dispersing an alcohol soluble protein in a resin-forming phenolic substance, condensing the dispersion with a resin-forming aldehyde in the presence of an alkaline catalyst and in an aqueous dispersion of said reacting materials at a temperature not over 100° C., whereby a water and alcohol soluble potentially reactive condensation product results, and neutralizing the alkali with an acid, whereby to lighten the color of the solution.

6. The process of making a thermo-setting resin product which comprises dispersing an alcohol soluble protein in a resin-forming phenolic substance, condensing the dispersion with a resin-forming aldehyde in the presence of an alkaline catalyst and in an aqueous dispersion of said reacting materials at a temperature not over 100° C., whereby a water and alcohol soluble potentially reactive condensation product results, neutralizing the alkali with an acid, whereby to lighten the color of the solution, and dewatering the solution at a temperature below 100° C. to provide a resin-base concentrate.

7. The process of making a thermo-setting resin product which comprises dispersing an alcohol soluble protein in a resin-forming phenolic substance, condensing the dispersion with a resin-forming aldehyde in an aqueous dispersion of said materials, said condensation being conducted at a temperature not higher than 100° C. whereby a water and alcohol soluble potentially reactive condensation product results, mixing the solution with an inert filler, and dewatering the resulting mass to solid substantially dry form to provide a thermo-setting molding composition.

8. A water and alcohol-soluble thermo-setting resin comprising the reaction product of an alcohol soluble protein and a resin-forming phenolic substance and a resin-forming aldehyde.

9. A water and alcohol soluble thermo-setting resin comprising the reaction product of zein, phenol and formaldehyde.

10. A water and alcohol soluble thermo-setting resin comprising the reaction product of zein, cresol and formaldehyde.

11. The method of making a resin which comprises reacting zein, a phenol and formalin at a temperature from 80° C. to 100° C. in the presence of a resin-forming condensing catalyst, whereby a homogeneous aqueous solution of a protein-containing resin is produced.

12. The method of making a resin which comprises reacting zein, a phenol and formalin at a temperature from 80° C. to 100° C. in the presence of a resin-forming condensing catalyst, whereby a homogeneous aqueous solution of a protein-containing resin is produced, and dewatering at a temperature below 100° C. to concentrate the resin.

13. The method of making a resin which comprises reacting zein, a phenol and formalin at a temperature from 80° C. to 100° C. in the presence of a resin-forming condensing catalyst, whereby a homogeneous aqueous solution of a protein-containing resin is produced, and adding a hardening agent whereby the liquid produces upon evaporation of water a heat-hardening resin.

14. The method of making a resin which comprises reacting zein, a phenol and formalin at a temperature from 80° C. to 100° C. in the presence of a resin-forming condensing catalyst, whereby a homogeneous aqueous solution of a protein-containing resin is produced, adding a hardening agent and wood flour, drying out water at below 100° C. to form a dry solid capable of use as a moulding compound.

15. A homogeneous solution useful for coating and impregnation comprising essentially water, and a reaction product of an alcohol soluble protein, a resin-forming phenol and a resin-forming aldehyde, said reaction product being capable of hardening by heat.

16. A homogeneous solution useful for coating and impregnation comprising essentially water, a water-miscible alcohol, and a reaction product of an alcohol soluble protein, a resin-forming phenol and a resin-forming aldehyde, said reaction product being capable of hardening by heat.

17. A homogeneous solution useful for coating and impregnation comprising essentially water, a resin-hardening agent, and a reaction product of an alcohol-soluble protein, a resin-forming phenol and a resin-forming aldehyde, said reaction product being capable of hardening by heat.

18. A homogeneous solution useful for coating and impregnation comprising assentially water, a water-miscible alcohol, a resin-hardening agent, and a reaction product of an alcohol-soluble protein, a resin-forming phenol and a resin-forming aldehyde, said reaction product being capable of hardening by heat.

19. A heat-hardening resin-forming substance comprising a water-insoluble alcohol-soluble reaction product of an alcohol-soluble protein, a resin-forming phenol and a resin-forming aldehyde.

HARRY M. WEBER.

CERTIFICATE OF CORRECTION.

Patent No. 2,264,732.                      December 2, 1941.

HARRY M. WEBER.

It is hereby certified that error appears in the printed specification of the above numbered patent requiring correction as follows: Page 2, second column, line 14, for "$90°$ C." read --$98°$ C.--; and that the said Letters Patent should be read with this correction therein that the same may conform to the record of the case in the Patent Office.

Signed and sealed this 20th day of January, A. D. 1942.

(Seal)

Henry Van Arsdale,
Acting Commissioner of Patents.